United States Patent [19]

Hayashi et al.

[11] Patent Number: 4,804,857
[45] Date of Patent: Feb. 14, 1989

[54] RELAY MECHANISM FOR A STEERING WHEEL

[75] Inventors: Chikahisa Hayashi; Shuji Inui; Tetsushi Hiramitsu; Atsuo Hirano; Takanori Kantoh, all of Aichi, Japan

[73] Assignee: Toyoda Gosei Co., Ltd., Nishikasugai, Japan

[21] Appl. No.: 125,002

[22] Filed: Nov. 24, 1987

[30] Foreign Application Priority Data

Nov. 28, 1986 [JP] Japan ............................ 61-284839
Nov. 29, 1986 [JP] Japan ............................ 61-285083

[51] Int. Cl.$^4$ ............................................. H01H 9/00
[52] U.S. Cl. ................................... 307/10 R; 74/485; 200/61.54; 439/15; 439/21; 280/731
[58] Field of Search ............... 307/10 R, 39, 115, 121, 307/151; 340/55, 56, 54, 52 R; 200/61.54, 61.55, 61.56, 61.57, 61.27, 61.38, 61.31, 61.35, 61.57; 439/4, 13, 15, 16, 20, 27, 21, 32, 132, 164, 217, 869, 491; 74/552, 442, 485, 484 R; 280/730, 731, 734, 742, 735, 775, 779, 777; 29/872, 869, 259; 180/141, 148, 142, 90, 78, 79.1

[56] References Cited

U.S. PATENT DOCUMENTS

| | | | |
|---|---|---|---|
| 1,625,832 | 4/1927 | Stein | 439/15 |
| 3,066,386 | 12/1962 | Filipczak | 439/21 X |
| 4,310,174 | 1/1982 | Sundeen et al. | 280/731 |
| 4,571,469 | 2/1986 | Hanaki | 200/61.54 |
| 4,623,889 | 11/1986 | Tanaka et al. | 74/485 X |

FOREIGN PATENT DOCUMENTS 59-153643  9/1984  Japan .

Primary Examiner—William M. Shoop, Jr.
Assistant Examiner—Paul Ip
Attorney, Agent, or Firm—Cushman, Darby & Cushman

[57] ABSTRACT

A relay mechanism for a steering wheel comprising a plurality of slip rings disposed isolated from each other in a circular track having a steering shaft as its center, and sliders, one provided at each slip ring. It further includes an arcuate common line slip ring extending so as to have a predetermined central angle, and a common line slider sliding on the common line slip ring with the steering shaft as its center, the common line slider being positioned at the midpoint of the common slip ring when the steering wheel is at its straight travel position. When the steering wheel is turned over more than a predetermined angle from its travel position, the common line connecting the slip rings and a power source is rendered non-conductive thereby to disable the signal transmission between the slip rings and electric devices.

8 Claims, 8 Drawing Sheets

RELAY MECHANISM FOR A STEERING WHEEL

FIELD OF THE INVENTION

This invention relates to a steering wheel for vehicles and more particularly to a relay mechanism for the steering wheel.

DESCRIPTION OF THE RELATED ART

A general relay mechanism between a pad and a column of a steering wheel includes a slip ring system which includes a plurality of annular slip rings concentric with the steering shaft and a slider. According to this system, the slip rings must have a predetermined width, so that the number of slip rings provided is limited, and it is difficult to provide a multiplicity of signal routes.

When many signal routes are required, it is proposed to employ an optical communication system relay mechanism which uses light, which is put to practical use in a local area.

The optical communication system relay mechanism uses many parts such as light emitting elements, photosensitive elements, photoconductive rings, a modulator, a demodulator, etc., so that it is considerably expensive as well as it provides a complicated structure, so that assembling is troublesome.

The inventors conducted many studies to develop a relay mechanism which uses slip rings and which is free from the above problems and have found a particular slip ring. A slider unit 52 which makes contact with the particular slip ring includes a collar-like insulating base plate 54, a plurality of leaf springs 55 attached along the base plate and extending radially outward from the base plate, each leaf spring having a contact 56 caulked (i.e. squeeze-formed) at the other end thereof and a plurality of contacts 53 provided on the inner surface periphery of the base plate and connected electrically via leads 51 to the corresponding contacts 56, as shown in FIG. 16.

This slider unit 52 is manufactured by various steps such as forming leaf springs 55, fixing the springs to the base plate 54, examining the relay accuracy, and adjusting the mounting position of the springs 55 or contacts 56.

Therefore, the process for manufacturing the slider unit is complicated and cannot avoid an increase in the cost of the products. Since the structure of the slider unit is complicated, it is difficult to improve the accuracy of the products as well as to thin the products and to manufacture slider units having a reduced diameter.

Therefore, assembling of this relay mechanism with the steering wheel is expensive and the reliability on the accuracy of the relay mechanism is not so high. In addition, the entire relay mechanism cannot be thinned or miniaturized so as to have a reduced diameter.

SUMMARY OF THE INVENTION

It is an object of this invention to provide a relay mechanism for a steering wheel which is capable of forming a multiplicity of signal routes without impairing advantages of the slip ring system relay mechanism.

It is another object of this invention to provide a relay mechanism for a steering wheel which is capable of preventing a malfunction of electric devices when the steering wheel is turned over a large rotational angle.

It is still another object of this invention to provide a relay mechanism for a steering wheel which is light, simple in structure, and low in manufacturing cost.

It is a further object of this invention to provide a relay mechanism for a steering wheel which is capable of transmitting two kinds of signals using a single signal route.

It is an additional object of this invention to provide a relay mechanism for a steering wheel which is simple in structure and capable of improving the specification accuracy.

It is a still further object of this invention to provide a steering wheel relay mechanism which is thin, reduced in diameter, and contributing to lightening of the steering wheel itself.

In order to achieve the above objects, the invention includes a plurality of slip rings disposed isolated from each other along a circular track having a steering shaft as its center, a common line connecting the respective slip rings with a power supply, and switching means for rendering the common line non-conductive when the steering wheel is turned over more than a predetermined angle from its straight travel position.

Other objects of this invention will be apparent from an understanding of the embodiments of this invention which will now be described and clarified by the accompanying claims. Many advantages not referred to in this specification will be understood by those skilled in the art when this invention is carried out.

DETAILED DESCRIPTION OF THE PREFERRED EMBODIMENTS

A first embodiment of this invention will now be described with reference to FIGS. 1–6.

Figure 3:
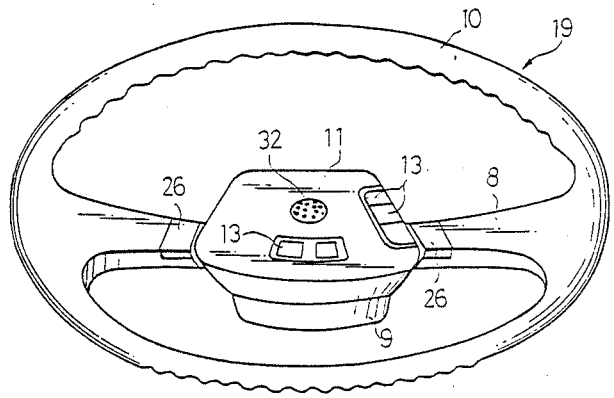
FIG. 3 is a perspective view showing a steering wheel.
Figure 4:
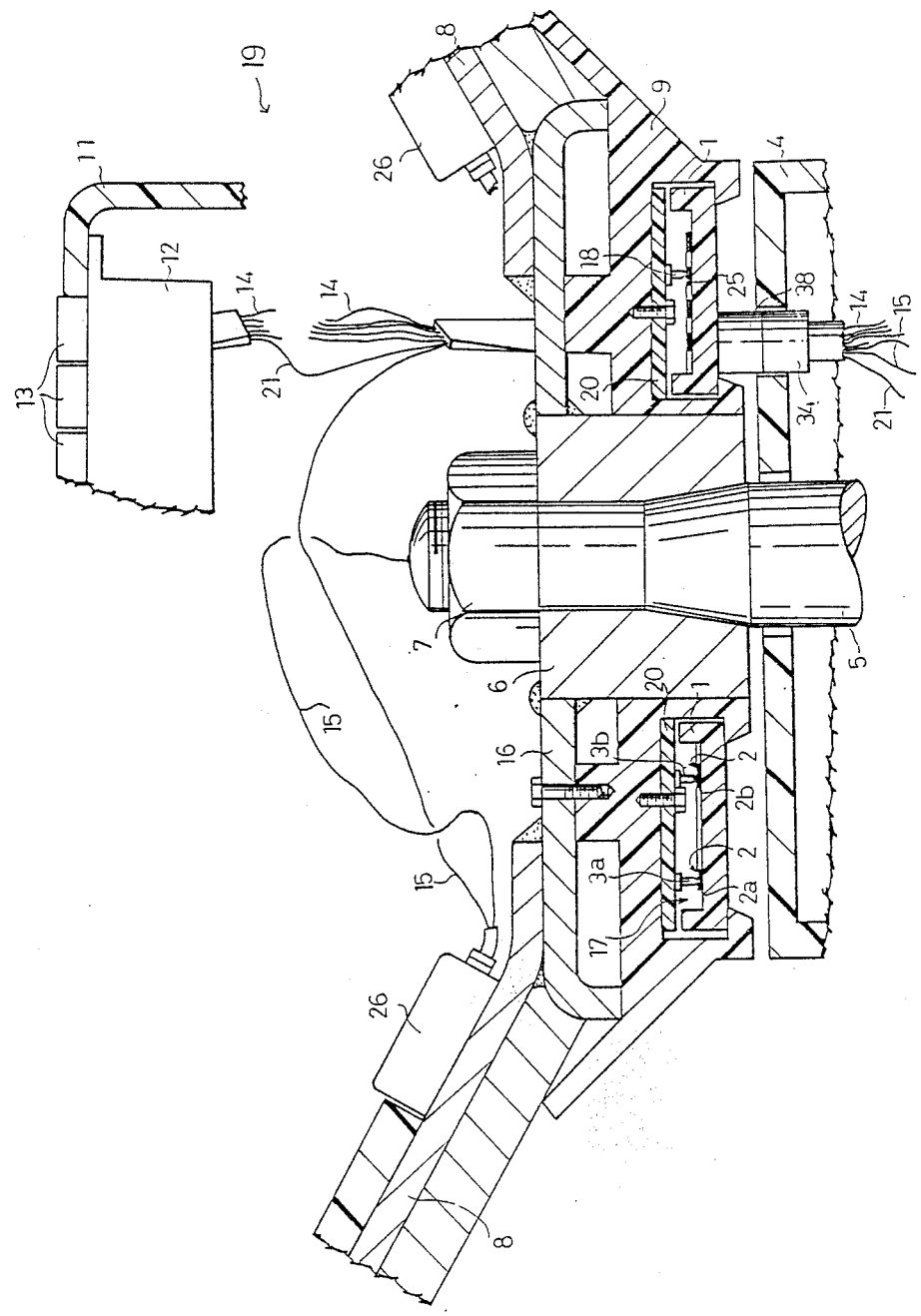
FIG. 4 is a partial cross-section view showing a steering wheel including the slip rings of the first embodiment.

As shown in FIG. 3 and 4, in a steering wheel 19 of the embodiment, a boss 6 is splined to an end of a steering shaft 5 extending upwardly through a column 4 and tightened by a nut 7.

A boss plate 16 is welded around the upper periphery of the boss 6. A lower cover 9 is fixed to a lower surface of the boss plate 16. As collar-like slider plate 20 is attached to a lower surface of the lower cover 9. A first and a second signal line sliders 3a, 3b and a common line slider 18 are attached to the slider base plate 20. These sliders 3a, 3b and 18 themselves include a contact pin having a well-known structure and shape and slide on slip rings to be described below at positions corresponding to the slip rings to perform a relay operation.

A collar-like slip ring base plate 1 is provided below and opposite to the slider plate 20. The base plate 1 is rotated relative to the slider plate 20 while being guided by the lower cover 9 without rotating relative to the column 4 during the steering operation.

Figure 1:
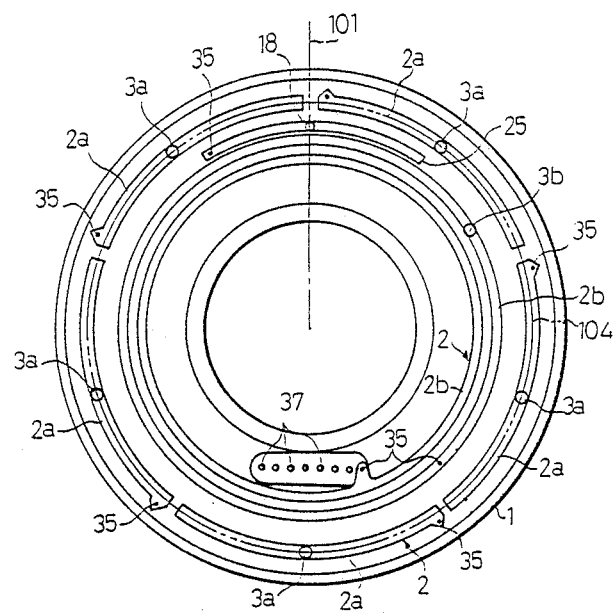
FIG. 1 is a top plan view showing the disposition of various slip rings on a ring base plate of a first embodiment.

The slip ring base plate 1 is made of a glass fiber reinforced epoxy resin. As shown in FIG. 1, a plurality of first arcuate signal line slip rings 2a (five slip rings in the embodiment) is formed isolated from each other by printing on the slip ring base plate 1 such that the slip rings 2a are disposed on a circular track 104 shown by the two-dot chain line drawn along the outer periphery of the slip ring base plate 1. The central angle of each slip ring 2a is about 70 degrees. When the steering wheel 19 is at its straight travel position, the respective sliders 3a are at the midpoints of the associated slip rings 2a. Two second signal line slip rings 2b are formed concentrically by printing inside the first signal line slip rings 2a.

An arcuate common line slip ring 25 is disposed as switching means between the two kinds of signal line slip rings 2a and 2b such that it extends rightward and leftward from a position corresponding to the position between adjacent first slip rings 2a with the common slip ring 25 having a central angle substantially equal to that of the first signal slip ring 2a. When the steering wheel 19 is at its neutral position, the common line slider 18 is located at the midpoint of the slip ring 25. In other words, the slip ring 25 is disposed on the slip ring base plate 1 such that its midpoint aligns with the straight travel direction 101 of the vehicle.

Figure 2:
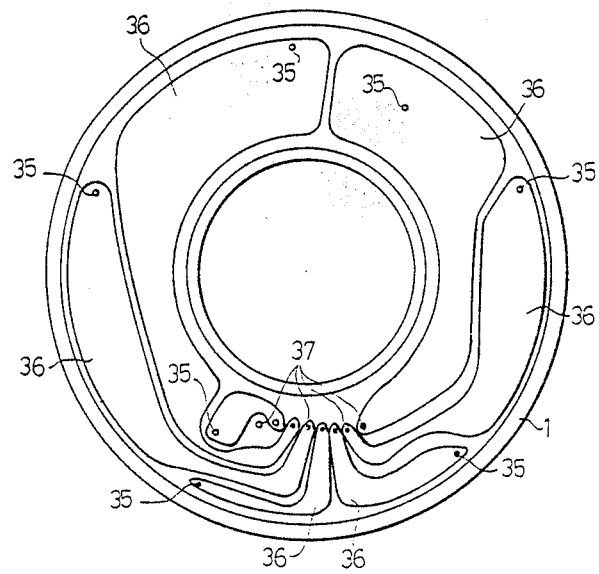
FIG. 2 is a view of the bottom of the slip ring base plate.

The respective slip rings 2a, 2b and 25 are connected electrically via through hoes 35 and copper films 36 as conductive means formed on the back of the slip ring base plate 1 with a group of through holes 37 disposed in a substantially straight line, as shown in FIG. 2 (the through hole 35 in the innermost second signal line slip ring 2b is the same as the corresponding through hole 37.).

The copper films 36 are covered with corresponding green masks (not shown). The through holes 37 receive a connector 38 which in turn receives a connector 34 which has terminals accommodating first signal line 14 extending from first electric devices (to be described later) such as an air conditioner, an audio, a telephone, etc., installed on the vehicle body, a second signal line 15 extending from a horn, and a common line 21.

Two spokes 8 are joined around the boss plate 16. Horn switches 26 as a second signal line switch are attached at the base of the spokes 8. The spokes 8 are attached at their outer ends to a ring 10 (FIGS. 3 and 4).

The horn switches 26 are electrically connected via a single second signal line 15 with second signal line slider 3b of the signal line sliders 3 sliding on the second signal line slip ring 2b and with the steering shaft 5 via another second signal line 15 so as to communicate with the horn.

A pad 11 is fixed to the lower cover 9. Provided in a switch box 12 attached to the part 11 are a first signal line switch 13 and a microphone 32. The switch 13 is electrically connected with the first signal line slider 3a and common line slider 18 provided on the lower surface of the slider plate 20 via the first signal line 14 and common line 21.

Figure 5:
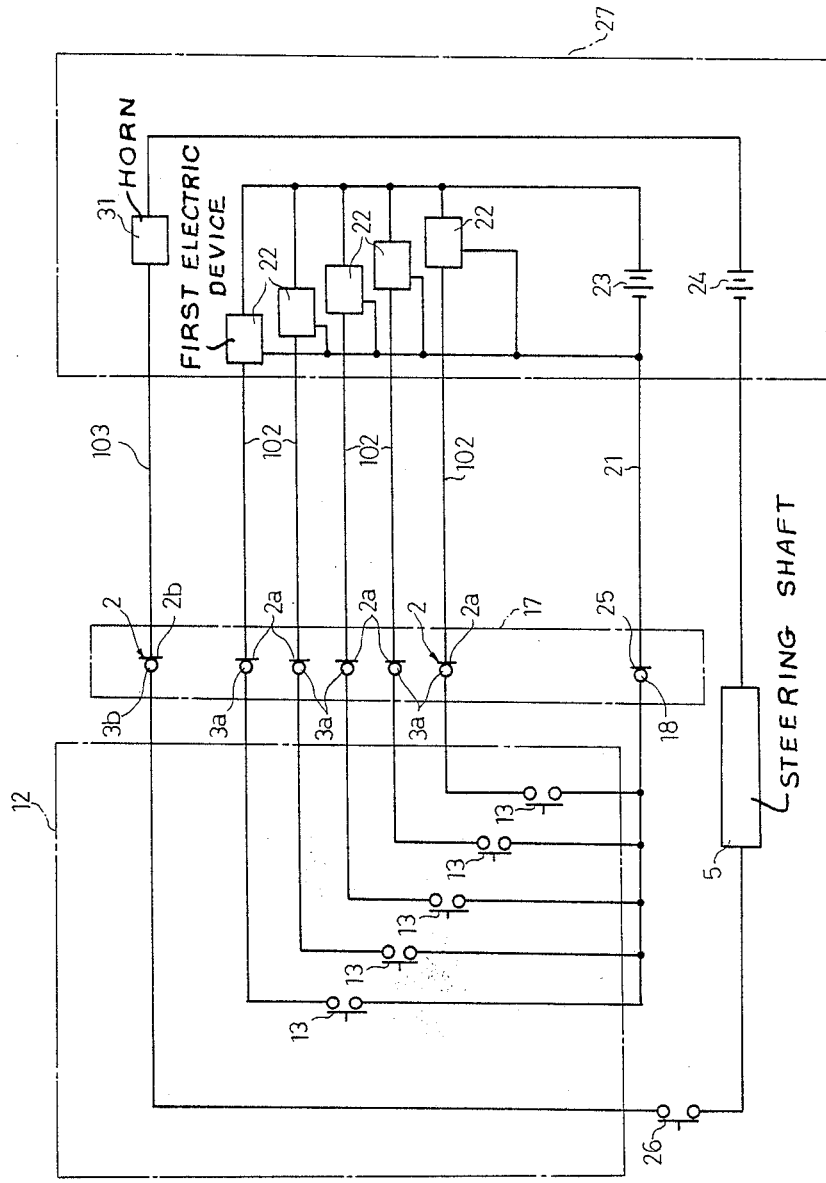
FIG. 5 is a circuit diagram showing the relay mechanism of the first embodiment.

Therefore, in this embodiment, five first signal routes 102 are formed, each of which includes first power source 23-first electric device 22-first signal line slip ring 2a-first signal line slider 3a-first signal line switch 13-common line slider 18-common line slip ring 25-common line 21-first power source 23, as shown in FIG. 5. A single second signal route 103 is formed which includes second power source 24-horn 31-second signal line slip ring 2b-second signal line slider 3b-horn switch 26-steering shaft 5-second power source 24 with the first and second signal routes not using the common line 21 in common.

First signal line switches 13 turn on and off the first electric devices 22 provided on the body 27 of the vehicle. The horn switch 26 turns on and off the horn 31.

A relay mechanism 17 in the first and second signal routes 102 and 103 is constituted by signal line sliders 3a, 3b common line slider 18 and slip rings 2a, 2b sliding on these sliders and common line slip ring 25 provided on the lower surface of the lower cover 9.

The operation and advantages of this embodiment will now be described. When the steering wheel 19 is at its straight travel position, the first signal line slider 3a and common line slider 18 make contact with the first signal line slip rings 2a and common line slip ring 25, respectively, at the midpoints thereof, as shown in FIG. 1.

If the steering wheel 19 is turned rightward or leftward over less than one half $\theta$ of the central angle (FIG. 6) of the common line slip ring 25 from its straight travel direction 101 when the vehicle arrives at a curved road, the common line slider 18 will not slip off the common line slip ring 25. Therefore, the common line 21 will not become non-conductive and switching is possible in the first signal route 102.

Usually, the rotational angle of the steering wheel 19 is less than 15 degrees on a highway, and less than 25 degrees in an urban area, which is less than the angle $\theta$(35 degrees) in this embodiment. Therefore, in the steering wheel 19 of this embodiment, switching is possible in the first signal routes 102 without hindrance.

Figure 6:
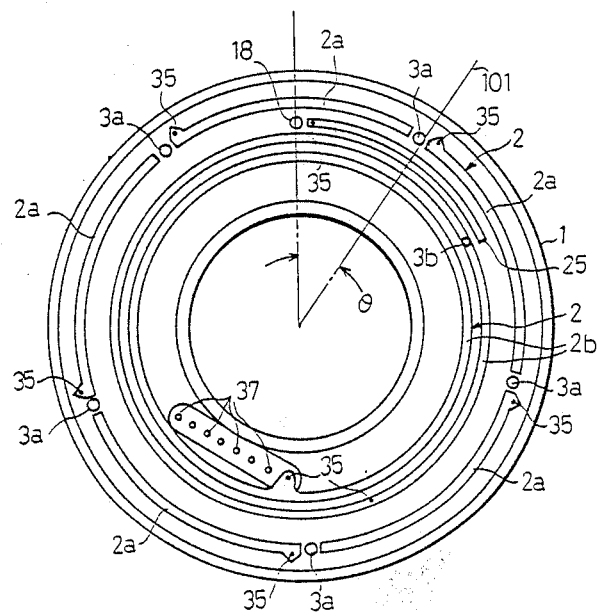
FIG. 6 is a top plan view showing the relationship between slip rings and slider unit when the steering wheel is turned.

When the steering wheel is turned beyond about 35 degrees during the time when the vehicle travels along a mountain road or the like, the respective first signal line sliders 3a slip off the corresponding first signal line slip rings 2a to move to adjacent slip rings 2a. Under such condition, when the switching is performed, the first signal line switches 13 do not correspond to the respective first electric devices 22, so that electric devices 22 other than the desired ones would operate. In the embodiment, however, as shown in FIG. 6, the common line slider 18 slips off the common line slip ring 25 to render the common line 21 non-conductive. Therefore, even if one first signal line switch 13 is pressed erroneously under the above condition, the corresponding first electric device 22 will not operate and a malfunction such as is described above is prevented. Since the second signal line slip ring 22b is annular, so that the second signal route 103 does not become non-conductive as does the first signal line route 102.

As described above, in this embodiment, the desired number of slip rings 2a which operate the first electric devices 22 are provided along the circular track 104, so that the number of signal routes is not limited by the width required of the slip rings 2a. Therefore, many signal routes can be formed without impairing the advantages of the slip ring system relay mechanism 17. In addition, the malfunction of the first electric devices 22 which would be produced when the steering wheel is turned over too large an angle is prevented. Therefore, the steering wheel with the relay mechanism 17 can transmit many signals, is light and simple in structure. The relay mechanism is easy to assemble, and low in manufacturing cost.

While the first embodiment of this invention has been described, it can be carried out, for example, in the following aspect.

(1) The second signal line slip ring 2b is divided into a plurality of arcuate segments, and corresponding different second signal routes 103 are formed through which signals can be transmitted.

(2) Metal leaf spring brushes and PCB leaf spring brushes are used having a function similar to that of the contact pins used as the signal line sliders 3a, 3b and common line slider 18.

(3) The common line slip ring 25 may be provided outside the first signal line slip rings 2a.

Figure 7:
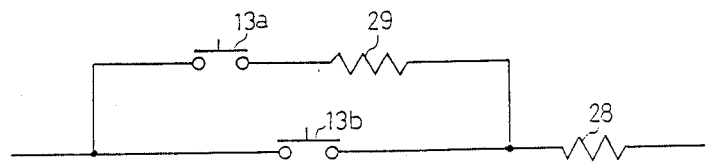
FIG. 7 is a partial circuit diagram showing one example of a signal switching means.

(4) As shown in FIG. 7, in place of each first signal line switch 13, a resistor 28 and a switch 13b are connected with each first signal line routes 101 and another switch 13a and a resistor 29 are connected in parallel with the switch 13b. Signal switching means is constituted which outputs voltages having two different levels via a single line route. Such structure enables the routes 101 to operate electric device twice as many as the devices 22. This transmission system can be employed similarly in the second signal route 103. Alternatively, circuits may be constituted which function similarly to the circuit including the resistors using Zener diodes instead of the resistors.

(5) A plurality of the circular tracks 104 is provided. The number of first signal lines slip rings 2a on one circular track 104 is determined in consideration of various factors. For example, it is determined by the conditions in which the malfunction of the electric devices do not occur when the steering wheel 19 is in a particular range of rotational angle. In the embodiment, the number of slip rings 2a is 2-10, and the central angle of the common line slip ring 25 is preferably in the range of about 30-60 degrees. If the central angle is less than 30 degrees, the switching means 25 is easily turned off and the number of first signal routes is limited if the central angle exceeds 60 degrees.

A second embodiment of this invention will now be described with reference to FIGS. 8-12.

Figure 8:
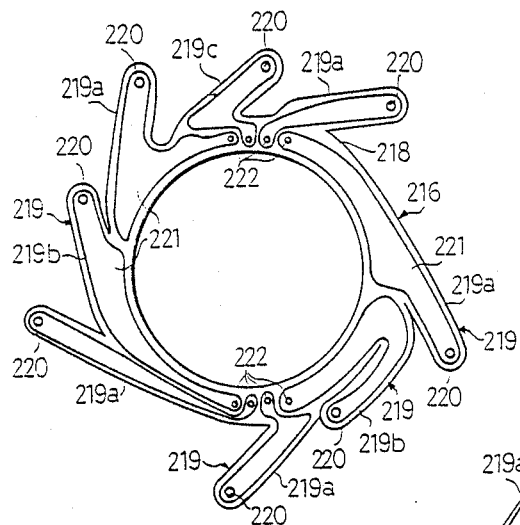
FIG. 8 is a top plan view slider unit of a second embodiment.
Figure 9:
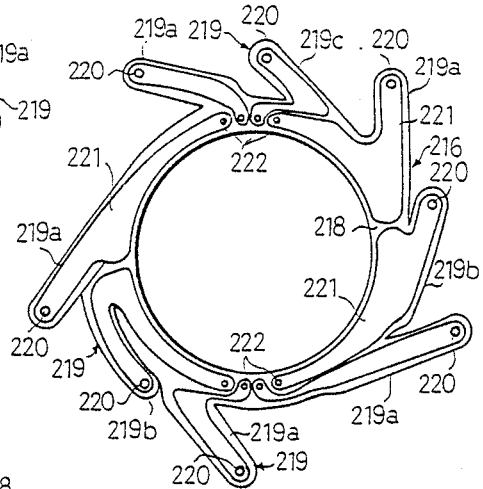
FIG. 9 is a bottom view of the second embodiment.
Figure 10:
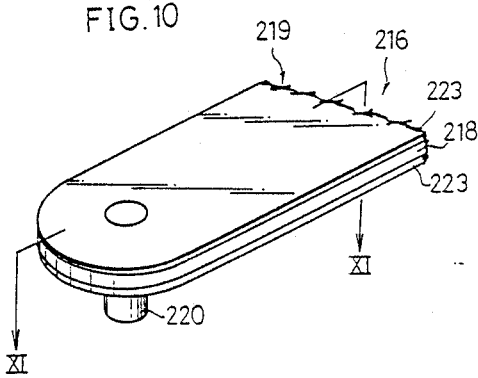
FIG. 10 is a perspective view showing a tongue of the sliding unit.
Figure 11:
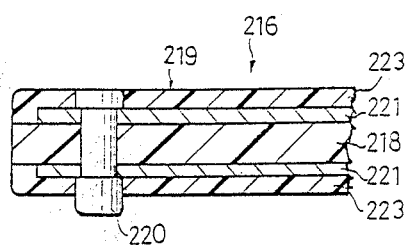
FIG. 11 is a cross-section view taken along the line XI—XI of FIG. 10.
Figure 16:
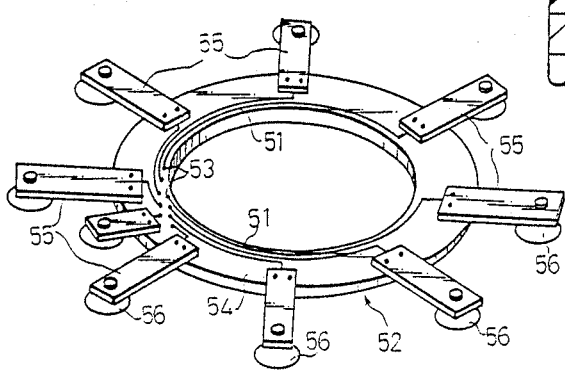
FIG. 16 is a perspective view of a slider unit in the associated art.
Figure 12:
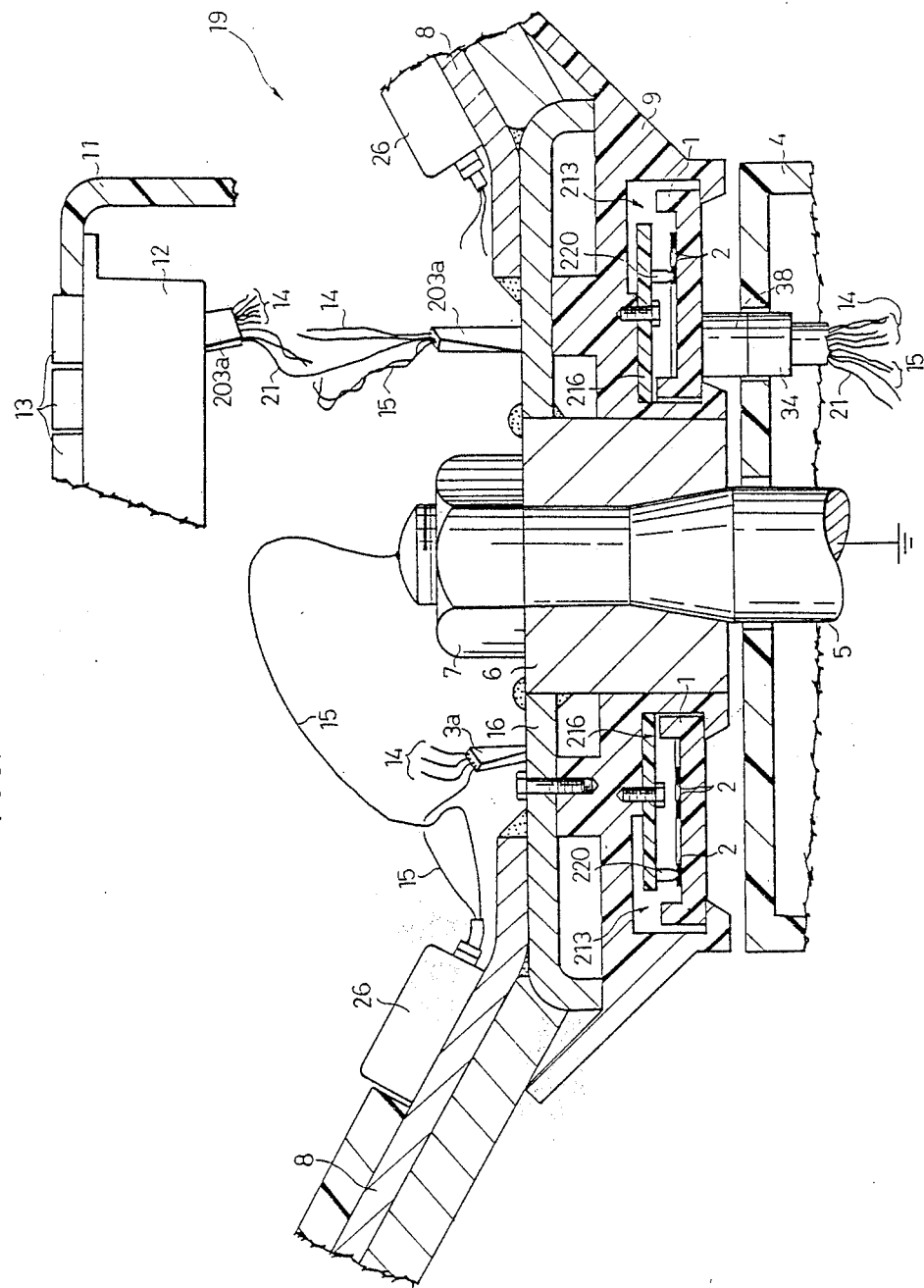
FIG. 12 is a partial cross-section view showing a steering wheel including the sliding unit of the second embodiment.

As shown in FIG. 12, a slider unit 216 is attached to the lower surface of the lower cover 9. As shown in FIGS. 8 and 9, the slider unit 216 includes an annular base plate 218 with 8 integral flexible tongues 219 extending outwardly in a voluted manner and sliders 220 caulked, (i.e. squeeze-formed) to the ends of corresponding tongues 219.

The annular base plate 218 is made of an electrically insulating material such as a glass fiber reinforced epoxy resin. Each of both the surfaces of the slider unit 216 is divided into 8 parts, each containing a corresponding base plate and tongue surface. Each of the 8 parts is covered with a printed copper film 221 as conductive means (FIG. 8-11). A copper film 221 on each surface is protected by a green mask 223 and isolated from adjacent copper film 221. The copper films 221 extending from the respective contacts 220 are divided into two groups and connected with the corresponding contacts provided separately on the plate 218. The opposing copper films 221 on the base plate 218 are joined by through hole 222. Therefore, the films 221 function as printed conductors which connecting electrically the sliders 220 and through holes 222.

The shape, number, length of the tongues 219 and the position of tongues 219 which protrude from the base plate 218 are determined in accordance with the structure, shape, etc., of slip rings 2a, 2b, 25 on the base plate 1.

In this embodiment, the tongue 219 includes 5 first longest signal line tongues 219a protruding outwardly from the base plate 218, two shorter protruding second signal line tongues 219b, and a single common line tongue 219c protruding to an intermediate position between the tongues 219a and 219b.

The through holes 222 are adapted to receive corresponding connectors (not shown) with which signal cables 203a, each including the first and second signal lines 15, 16 and common line 21, are adapted to be connected.

As shown in FIG. 12, the slip ring base plate 1 having the slip rings 2a, 2b, 25 is provided under and opposite to the slider unit 216, both the base plate 1 and the slider unit 216 constituting the relay mechanism 213 of this embodiment.

The operation and advantages of this embodiment will now be described. The relay mechanism 213 of this embodiment is similar in operation to the above embodiment.

In the relay mechanism 213 of this embodiment, the respective tongues 219a, 219b, 219c have flexibility, so that although their lengths are short, they exhibit their function as a spring member. Therefore, the sliders 220 fixed to the ends of the tongues are constantly urged against the slip rings 2a, 2b, 25, so that during the steering operation, the sliders 220 are turned while sliding on slip rings 2a, 2b, 25 thereby to ensure the contact between the sliders 220 and slip rings 2a, 2b, 25 at all times. Therefore, the relay mechanism 213 exhibits its function reliably.

The slider unit 216 itself is simple in structure, so that it can be manufactured by an automated process in which the number of manual steps is reduced. Thus, according to this embodiment, the product cost is reduced and the specification accuracy of the products is improved. The slider unit 216 itself is thinned or reduced so as to have a reduced diameter.

In the manufacturing process, the base plate 218 and the tongues 219 are formed integrally, so that it is unnecessary to pay attention to the assembly and assembling accuracy of the slider unit 216.

The conductors connecting the sliders 220 and through holes 222 are formed by copper films 221 which are composed of printed conductors using printed board forming techniques, so that the slider unit 216 is thinned and reduced in its diameter and the specification accuracy thereof is improved.

Therefore, the steering wheel 19 on which the relay mechanism 213 according to this embodiment is assembled provides high reliability of the relay accuracy. As the relay mechanism 213 is reduced in size, that portion of the relay mechanism 213 accommodated in the steering wheel 201 becomes compact and the steering wheel 19 is lightened.

Figure 13:
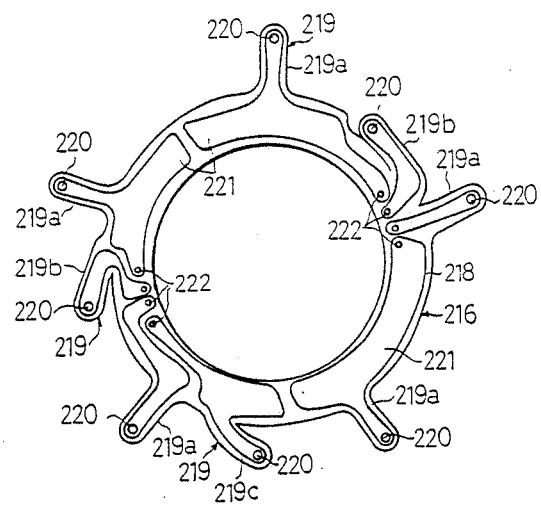
FIGS. 13 and 14 show bottom views of other examples of the slider unit.

While the second embodiment of this invention has been described, the embodiment can be carried out in the following aspect, for example, (1) As shown in FIG. 13, the first signal line tongues 219a protrude long radially and outwardly. The second signal line tongues 219b and common line tongue 219c protrude in a non-radial direction so that their lengths are greater than those of the above embodiment. Thus the urging forces of the tongues 219a, 219b, 219c against the slip rings 2a, 2b, 25 can be adjusted so as to be different from those of the tongues in the previous embodiment.

Figure 14:
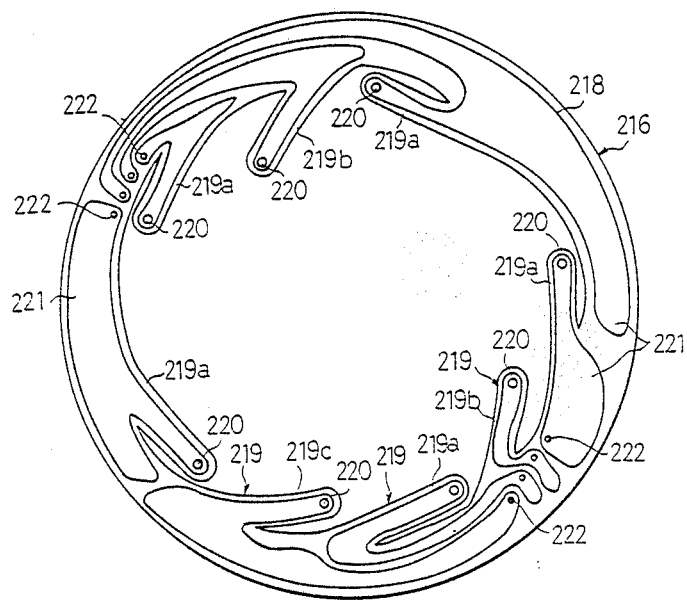

(2) As shown in FIG. 14, the respective tongues 219 protrude inwardly from the inner periphery of the base plate 218 so that the corresponding slip ring base plate 1 has a reduced diameter.

(3) The relay mechanism 213 may include slider unit 216 provided under the lower cover 9 and the slip ring base plate 1 provided above the lower cover 9.

Figure 15:
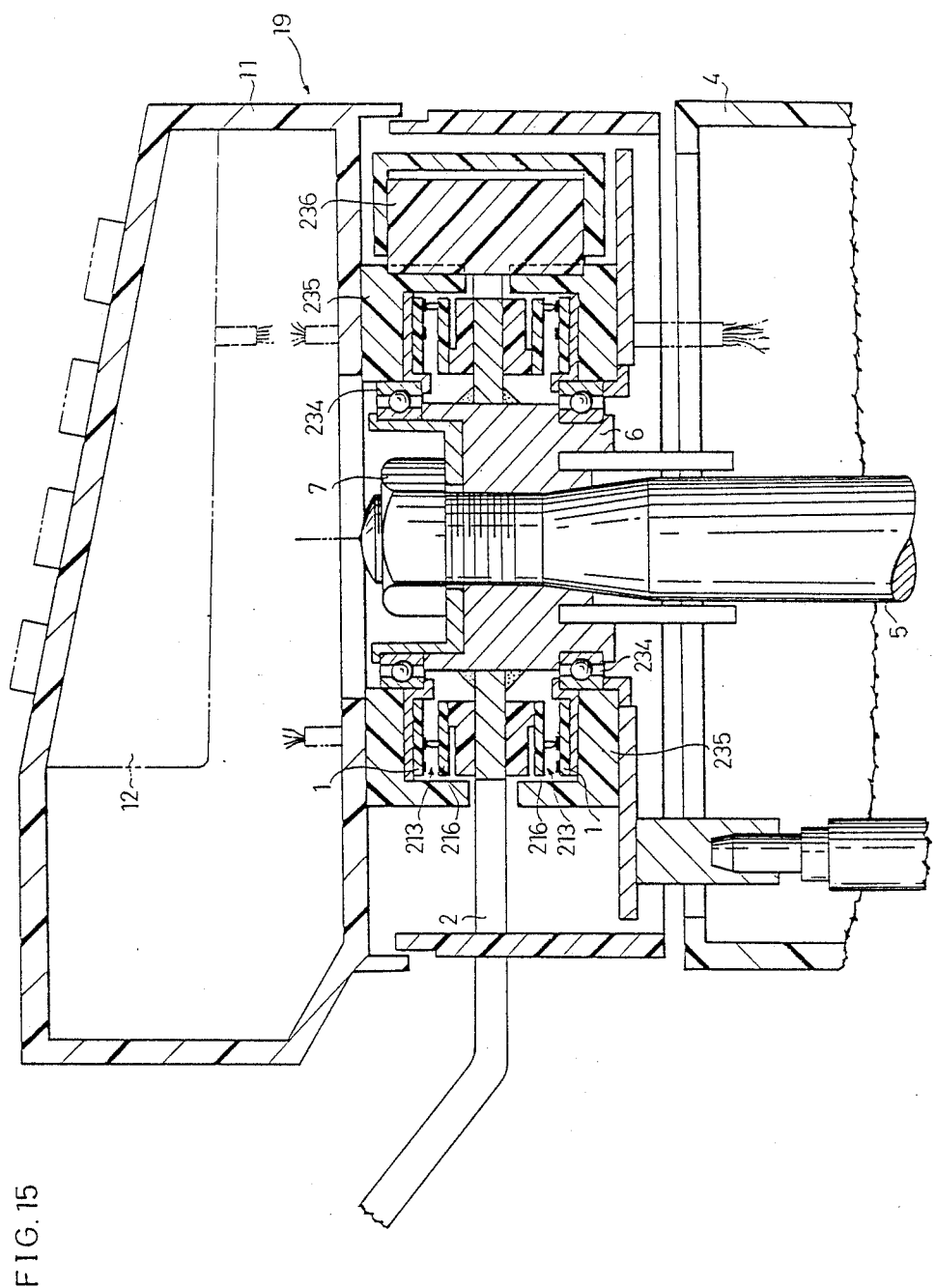
FIG. 15 is a cross-section view showing a steering wheel having a planetary gear mechanism in which a relay mechanism according to this invention is embodied.

(4) As shown in FIG. 15, this invention is applicable to a so-called non-turning pad steering wheel 19 in which sun gears 235 are disposed concentric with the steering shaft 5 via radial bearings 234 on the upper and lower periphery sides of the boss 6. Planetary gears 236, which mesh with and move around the corresponding sun gears 235, are mounted on the boss plate 16. The sun gears 235 have the slip ring base plate 1 with the slip rings 2a, 2b, 25. The slider unit 216 having the sliders 220 which make contact with the slip rings 2a, 2b, 25 is fixed to the boss plate 16. The slider unit 216 may have a structure shown in FIG. 8, for example. Thus, the relay mechanism 213 including the slider unit 216 and slip ring base plate 1 is thinned. Therefore, the conventional desire to thin the planetary gear mechanism including sun gears 235 and planetary gears 236 is satisfied.

(5) If the relay mechanism 213 can be mounted on the side of the lower cover 9, it may be mounted in any mounting mode.

(6) As a relay mechanism of the present invention, the slip ring of the first embodiment may be used, as a matter of course, together with the slider unit 216 of the second embodiment.

It is obvious that greatly varying embodiments can be constituted without being contrary to the spirit and scope of this invention, so that this invention is not restricted by its particular embodiments except for the limitations in the attached claims.

What is claimed is:

1. A relay mechanism for a steering wheel comprising:
   a plurality of slip rings disposed isolated from each other along a circular track, said circular track having a steering shaft as the center thereof;
   a common line connecting the respective slip rings and a power source; and
   switching means for rendering the common line nonconductive when the steering wheel is turned over more than a predetermined angle from a straight travel position of the steering wheel.

2. A relay mechanism for a steering wheel according to claim 1, wherein the switching means includes an arcuate common line slip ring having a central angle twice as large as the predetermined angle and having the steering shaft as its center, and a slider sliding on the common line slip ring, the slider being positioned at the midpoint of the common line slip ring when the steering wheel is at said straight travel position thereof.

3. A relay mechanism for a steering wheel according to claim 2, further including sliders sliding on the slip ring, the respective slip rings extending in a circular arc so as to have substantially the same central angle as the common line slip ring with the steering shaft as their center and the sliders being positioned at the respective midpoints of the slip rings when the steering wheel is at said straight travel position thereof.

4. A relay mechanism for a steering wheel according to claim 1, further including signal switching means connected to the respective slip rings for selectively transmitting two kinds of signals to electric devices via the slip rings.

5. A relay mechanism for a steering wheel comprising:
   a pluraity of slip rings; and
   a slider unit comprising:
   an insulating base plate, a plurality of flexible tongues formed integrally with the base plate, the tongues protruding from the base plate to a position opposite to the slip rings, and sliders, each provided at the end of the corresponding tongue, for sliding on the corresponding slip rings.

6. A relay mechanism for a steering wheel according to claim 5, wherein the base plate is substantially annular, and wherein the tongues protrude in a direction intersecting the radius of the base plate.

7. A relay mechanism for a steering wheel according to claim 5, wherein the slider unit further includes printed conductors extending from the sliders toward the base plate.

8. A relay mechanism for a steering wheel according to claim 5, wherein a plurality of slip rings are disposed isolated from each other in a circular track, said circular track having the steering shaft as the center thereof.

* * * * *